H. W. BELL.
VEHICLE SUSPENSION.
APPLICATION FILED JAN. 11, 1921.
1,427,933.
Patented Sept. 5, 1922.
2 SHEETS—SHEET 1.
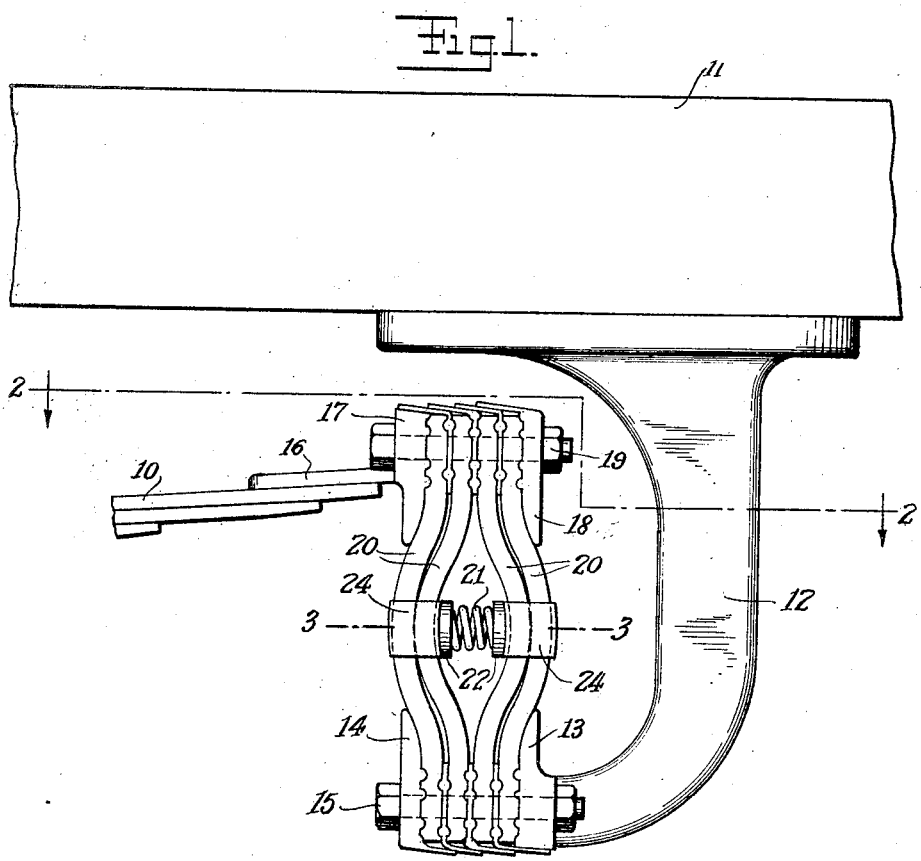
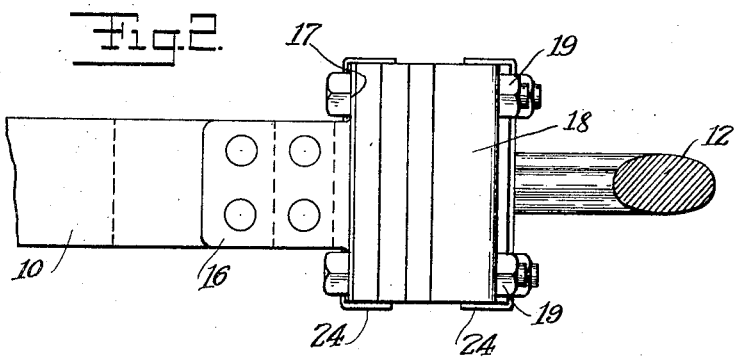
Inventor
Harvey W. Bell
By his Attorney
E. W. Marshall H. W. BELL.
VEHICLE SUSPENSION.
APPLICATION FILED JAN. 11, 1921.
1,427,933.
Patented Sept. 5, 1922.
2 SHEETS—SHEET 2.
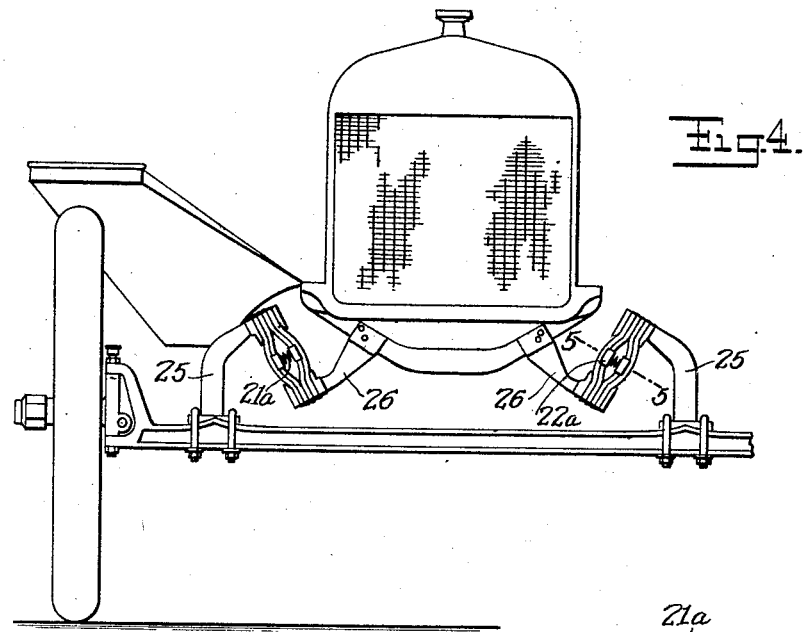
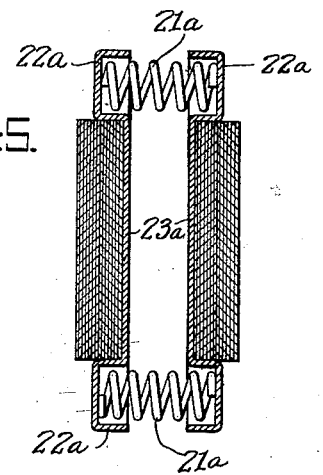
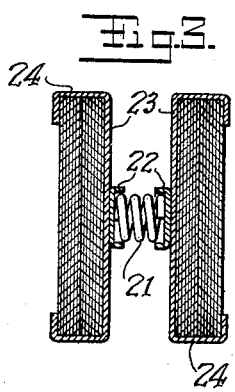
Inventor
Harvey W. Bell
By his Attorney
E. W. Marshall Patented Sept. 5, 1922.

1,427,933

UNITED STATES PATENT OFFICE.

HARVEY W. BELL, OF YONKERS, NEW YORK, ASSIGNOR TO THE BELOYT CORPORATION, OF DOVER, DELAWARE, A CORPORATION OF DELAWARE.

VEHICLE SUSPENSION.

Application filed January 11, 1921. Serial No. 436,433.

*To all whom it may concern:*

Be it known that I, HARVEY W. BELL, a citizen of the United States of America, and a resident of Yonkers, Westchester County, and State of New York, have invented certain new and useful Improvements in Vehicle Suspensions, of which the following is a specification.

The objects of my present invention are to furnish a spring suspension for vehicles which will be relatively simple and inexpensive, which will provide the desired flexibility, which will be durable, noiseless in operation and will require no lubrication.

In the accompanying drawings I have illustrated different forms and uses of the invention, but wish it understood that the invention may be further modified without departure from the true spirit and scope of the invention.

Figure 1 is a broken side elevation of the invention as used as a suspension link between a semi-elliptic spring and frame of a motor vehicle.

Figure 2 is a sectional plan view as taken on substantially the plane of line 2—2 of Figure 1.

Figure 3 is a cross sectional view of the suspension link as on substantially the plane of line 3—3 of Figure 1.

Figure 4 is an illustration of the invention adapted to vehicles of the "Ford" type.

Figure 5 is an enlarged cross sectional view of the suspension link last illustrated, this view being taken on substantially the plane of line 5—5 of Figure 4.

In Figures 1 and 2 the numeral 10 designates the side spring of the vehicle and 11 represents the sill portion of the body. The sill or body member carries a dependent bracket 12 terminating in relatively fixed and movable jaws 13, 14 which are held together by bolts 15 to rigidly secure the lower end of the suspension link.

Similarly, the leaf spring 10 carries a bracket 16 provided with relatively fixed and movable jaws 17, 18 secured together by bolts 19, to rigidly hold the upper end of the suspension link.

The suspension link consists in this disclosure of a series of four strips 20 of flexible material in the nature of rubber impregnated canvas belting, said strips being arranged in pairs and having an expansion spring or springs 21 interposed mid-length between the adjacent pairs.

In the first form illustrated, only a single spring is employed and this spring is shown as seated at its opposite ends in sockets 22 carried by the bearing plates 23 which extend across the opposed inner faces of the strip and terminate in angular portions 24 extending about the edges of the strips.

Where greater expansion is desired or heavier spring force is required, more than one spring may be employed and said spring may be located exteriorly of the strips, for instance, at the edges thereof as I have shown at 21ᵃ in Figure 5. In this instance the spring seats 22ᵃ are located at the ends of the bearing plates 23ᵃ. This construction permits of the use of much longer springs and hence provides for greater resilience than the first form and the spring action is better balanced.

In some instances, particularly in the case of relatively light cars, this suspension link may be used as the sole spring support for the body. This point I have illustrated in Figure 4 where the links are shown as rigidly connected at their opposite ends to brackets 25, 26 affixed to the axle and the body frame respectively of the car. The flexible webs of the links, in connection with the spreading springs, provide in this case a resilient spring connection between the running gear and the body.

What I claim is:

1. In vehicle suspensions, a suspension link comprising supporting strips, a resilient spring element interposed between said strips and means for rigidly securing opposite ends of said strips to related relatively movable parts of the vehicle.

2. A spring suspension for vehicles comprising a suspension link made up of cooperating flexible strips rigidly held at opposite ends to related relatively movable parts of a vehicle and having the intermediate portions of the strips normally bowed apart by resilient spring means.

3. A spring suspension for vehicles comprising a suspension link made up of cooperating flexible strips rigidly held at opposite ends to related relatively movable parts of a vehicle and having the intermediate portions of the strips normally bowed apart by resilient spring means and including plates bearing against the inner opposed faces of the strips and terminating in external spring seats at the edges of the strips with helical springs engaged in said seats.

4. A suspension link for vehicles comprising cooperating strips of flexible material, means for securing opposite ends of said link to related relatively movable parts of a vehicle and a spreading spring interposed between the cooperating strips of the link.

5. A suspension link for vehicles comprising cooperating strips of flexible material, means for securing opposite ends of said link to related relatively movable parts of a vehicle, a spreading spring interposed between the cooperating strips of the link and bearing plates engaged with the opposed faces of the strips and provided with seats for the ends of the spreading spring.

6. A suspension link for vehicles comprising cooperating strips of flexible material, means for securing opposite ends of said link to related relatively movable parts of a vehicle, a spreading spring interposed between the cooperating strips of the link and bearing plates engaged with the opposed faces of the strips and provided with seats for the ends of the spreading spring, said bearing plates having portions at the ends thereof engaged about the edges of the strips.

7. A suspension link for vehicles comprising cooperating strips of flexible material, means for securing opposite ends of said link to related relatively movable parts of a vehicle, a spreading spring interposed between the cooperating strips of the link and bearing plates engaged with the opposed faces of the strips and provided with seats for the ends of the spreading springs, said seats being disposed at the edges of the strips to thereby locate the springs exteriorly of the space between the strips.

In witness whereof, I have hereunto set my hand this 10th day of January, 1921.

HARVEY W. BELL.